United States Patent [19]
Ladd et al.

[11] Patent Number: 5,342,242
[45] Date of Patent: Aug. 30, 1994

[54] ENGINE/TRANSMISSION ROTARY CONNECTION

[75] Inventors: Barry L. Ladd, Zionsville; Michael B. Pociask, Plainfield, both of Ind.

[73] Assignee: General Motors Corporation, Detroit, Mich.

[21] Appl. No.: 15,724

[22] Filed: Feb. 9, 1993

[51] Int. Cl.5 .............................................. F16D 3/50
[52] U.S. Cl. .................................................... 464/98
[58] Field of Search ........................ 464/98; 74/572; 24/274 R, 279; 192/3.28, 3.3

[56] References Cited

U.S. PATENT DOCUMENTS

| | | | |
|---|---|---|---|
| 2,249,292 | 7/1941 | Kapitza | 464/98 X |
| 2,556,293 | 6/1951 | Nordt, Jr. | 464/98 X |
| 2,855,767 | 10/1958 | Ahlen | 464/98 |

FOREIGN PATENT DOCUMENTS 0838152  6/1981  U.S.S.R. ................ 464/98

Primary Examiner—Clifford D. Crowder
Assistant Examiner—John J. Calvert
Attorney, Agent, or Firm—Donald F. Scherer

[57] ABSTRACT

An engine output shaft and a transmission torque converter are connected for torque transmission therebetween. A flex plate is disposed between, and secured for rotation with either, the output shaft or the torque converter input shell. The flex plate includes an axially extending rim frictionally engaged with an annular wall secured either the output shaft or the torque converter input shell. A clamp member surrounds the rim on the flex plate radially outward of the annular wall and is selectively tightened to establish a force therein to cause the frictional engagement to be sufficient to transmit the torque.

4 Claims, 3 Drawing Sheets

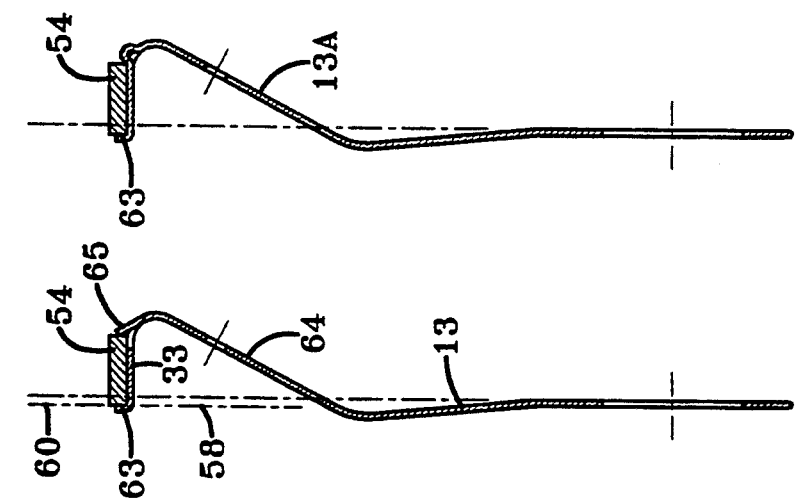
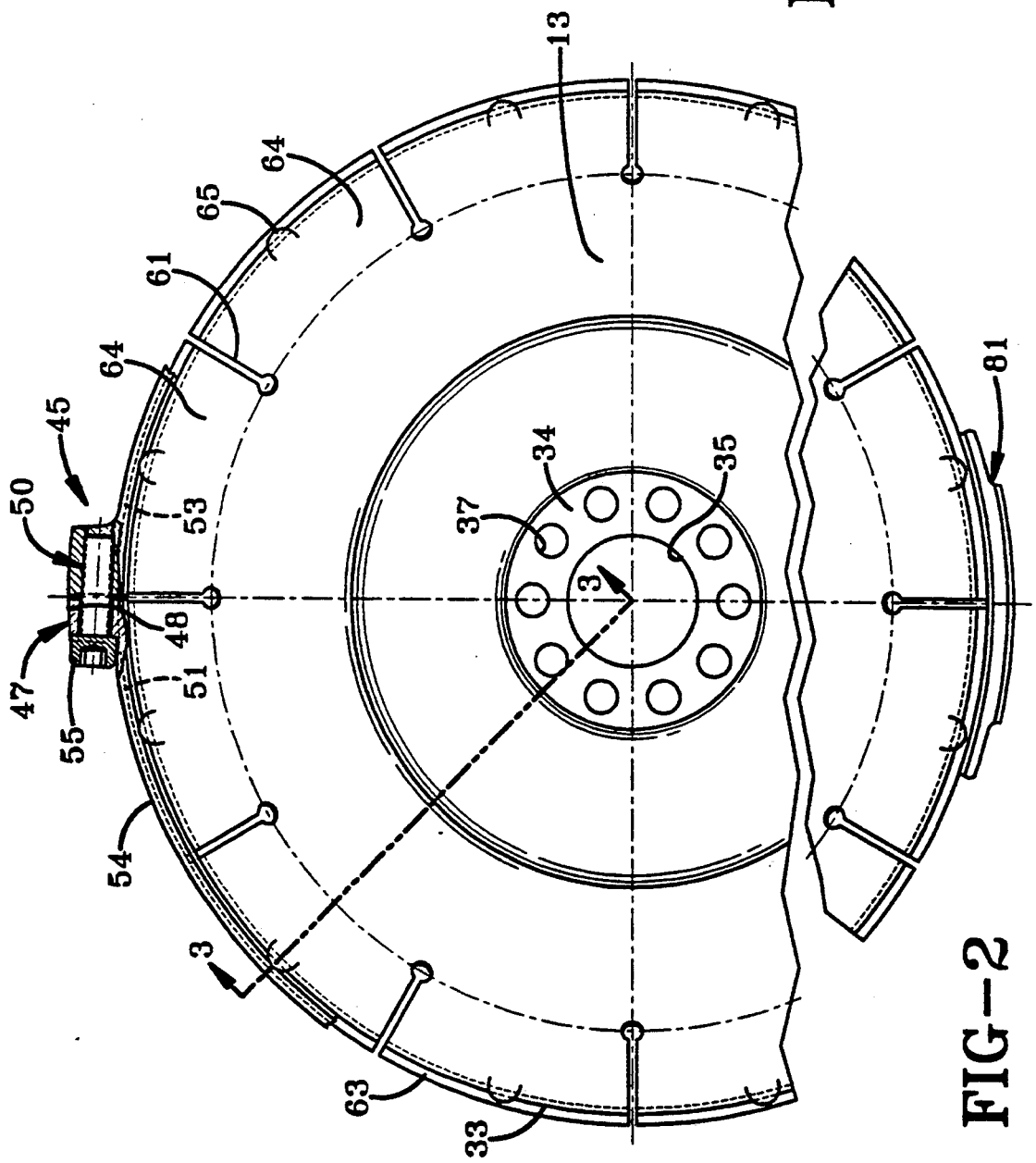

ENGINE/TRANSMISSION ROTARY CONNECTION

TECHNICAL FIELD

The present invention relates generally to drive joint connections between an engine output and a transmission input interface. More particularly, the present invention relates to drive joint interfaces wherein a operative frictional connection is continuously provided at one member of the interface. Specifically, the present invention relates to a flex plate drive connection between an engine crankshaft and a torque converter input shell wherein a continuous frictional connection is established at either the engine or the torque converter.

BACKGROUND OF THE INVENTION

A drive connection between an engine and torque converter incorporates a flex plate to accommodate misalignment between the centerlines of the engine and the transmission as well as movement due to hydraulic forces in the torque converter. The flex plate is typically connected by threaded fasteners to both the engine crankshaft and lugs welded to the torque converter input shell. It is customary alternative to employ threaded fasteners connected to both the engine flywheel and a flange on the torque converter. In either event, the flex plate is bolted to one member prior to joining the engine and transmission. To assemble the units, they are aligned and a nose on the torque converter is slid into a bushing, or pilot, in the crankshaft. The other connection is then made by inserting a bolt through an access aperture and threading it to an opening in the proper unit. The engine and transmission must then be rotated on their respective axes until another threaded opening is presented to the access aperture so another bolt may be threaded in position. This process is continued until twelve or more bolts are installed and properly tightened. This is a time consuming process. Moreover, the process is subject to errors in that a bolt can be omitted, not completely tightened or cross threaded. In fact, this assembly process may require the need for two employees on a paced assembly line. The disadvantages are compounded every time it is necessary to disassemble the connection for repairs or inspections.

An alternative is to provide a slide-together assembly in the form of a spline or toothed connection. With slide-together interfaces, the engine flywheel and a flange on the torque converter are mated at assembly. The drive interface is maintained by the securement between the housings. However, due to the amount of movement caused by misalignment and/or hydraulic forces in the torque converter, a dry spline or toothed connection does not meet the durability requirements for commercial, on-highway vehicles. Thus, this type connection tends to require lubrication. As a result, these drive interfaces have been limited to off-highway and track-laying types of vehicles where continual maintenance is employed.

SUMMARY OF THE INVENTION

It is, therefore, a primary object of the present invention to provide an improved drive interface between an engine and transmission which requires that only one threaded member be tightened.

It is another object of the present invention to provide an improved drive connection interface between an engine and transmission, as above, wherein the installation time is maintained at a minimum.

It is a further object of the present invention to provide an improved drive connection interface between an engine and transmission, as above, wherein a slide together assembly is provided.

It is still another object of the present invention to provide an improved drive connection interface between an engine and transmission, as above, wherein a flex plate is secured to one drive transmitting member and frictionally mated with another drive transmitting member by the tightening of a single threaded member.

It is yet another object of the present invention to provide a drive connecting interface between an engine and transmission, as above, wherein the flex plate has a rim portion and clamp assembly frictionally engaging an axial wall at the interface.

These and other objects of the invention, as well as the advantages thereof over existing and prior an forms, which will be apparent in view of the following detailed specification, are accomplished by means hereinafter described and claimed.

In general, a drive connection interface embodying the concepts of the present invention overcomes the disadvantages of the prior art by utilizing an operative slide-together concept which does not employ the historically unacceptable spline connections. The drive interface presented herein has a flex plate provided with an axially extending annular rim that is disposed circumjacent an annular wall on either an engine flywheel or a flange secured to the torque converter. A band clamp is disposed circumjacent the flex plate rim. The band clamp incorporates a single threaded fastener which, when tightened, is effective to reduce the diameter of the clamp band such that a normal force is applied to the interface between the flex plate rim and the wall on the drive member other than that to which the flex plate is secured. This band clamp connection establishes a friction force which is sufficient to prevent the flex plate from rotating relative to the wall.

The flex plate is connected in a conventional bolt-together fashion to a flange on the other drive member. The flex plate is bolted to the flange at a location where the flange is easily accessible. For example, the flex plate may be bolted to the engine crankshaft prior to the installation of the transmission, while the end of the crankshaft is accessible. At assembly between the engine and transmission, the shafts are aligned, the nose is positioned in the bushing and the rim, with the damp loosely in place, is slid onto the wall. The clamp fastener is accessed through an opening and tightened to complete the drive connection.

The band clamp is trapped on the rim of the flex plate which is stamped from sheet metal and has radial, and axial, slots at the outer periphery that permit the rim to compress about, or otherwise accommodate to, the outer surface of the wall. During the forming of the slots in the outer rim, an outward lip is formed, and a plurality of raised fingers are formed on opposite sides of the rim. The lip and fingers cooperate to trap the band clamp on the rim prior to, and during, assembly of the engine and transmission.

The clamp is preferably a simple strap of metal with a threaded device connected therewith to draw the ends of the band toward each other as it is tightened on the rim. Prior to assembly the band clamp inner surface is preferably coated with a solid lubricant to effect a uniform stress field and clamp load around its circumference.

At assembly, the flex plate and clamp assembly is bolted at the inner diameter to either the torque converter or an engine crankshaft adapter. The annular wall is provided on the other of the engine or torque converter in the form of a flywheel or an adapter ring. As the engine and transmission are pushed together, the flex plate and clamp assembly slip over the annular wall. The transmission and engine housings are bolted together at their flanged, external split-line and the clamp is tightened by accessing the threaded device through an access aperture in the transmission housing.

The present invention is described in conjunction with an exemplary embodiment of an interface drive connection, a variation in the configuration of the band clamp rim as well as a variation in the configuration of the tightening mechanism which are deemed sufficient to effect a full disclosure of the subject invention. The exemplary drive connection is described in detail without attempting to show all of the various forms and modifications in which the invention might be embodied; the invention being measured by the appended claims and not by the details of the specification.

BRIEF DESCRIPTION OF THE DRAWINGS

FIG. 2 is a frontal elevational view of a flex plate and band clamp assembly used with the present invention;

FIG. 3 is a radially oriented sectional view taken substantially along line 3—3 of FIG. 2;

FIG. 4 is a view similar to FIG. 3 depiction the outer rim of an alternative design of the flex plate;

DESCRIPTION OF AN EXEMPLARY EMBODIMENT

Figure 1:
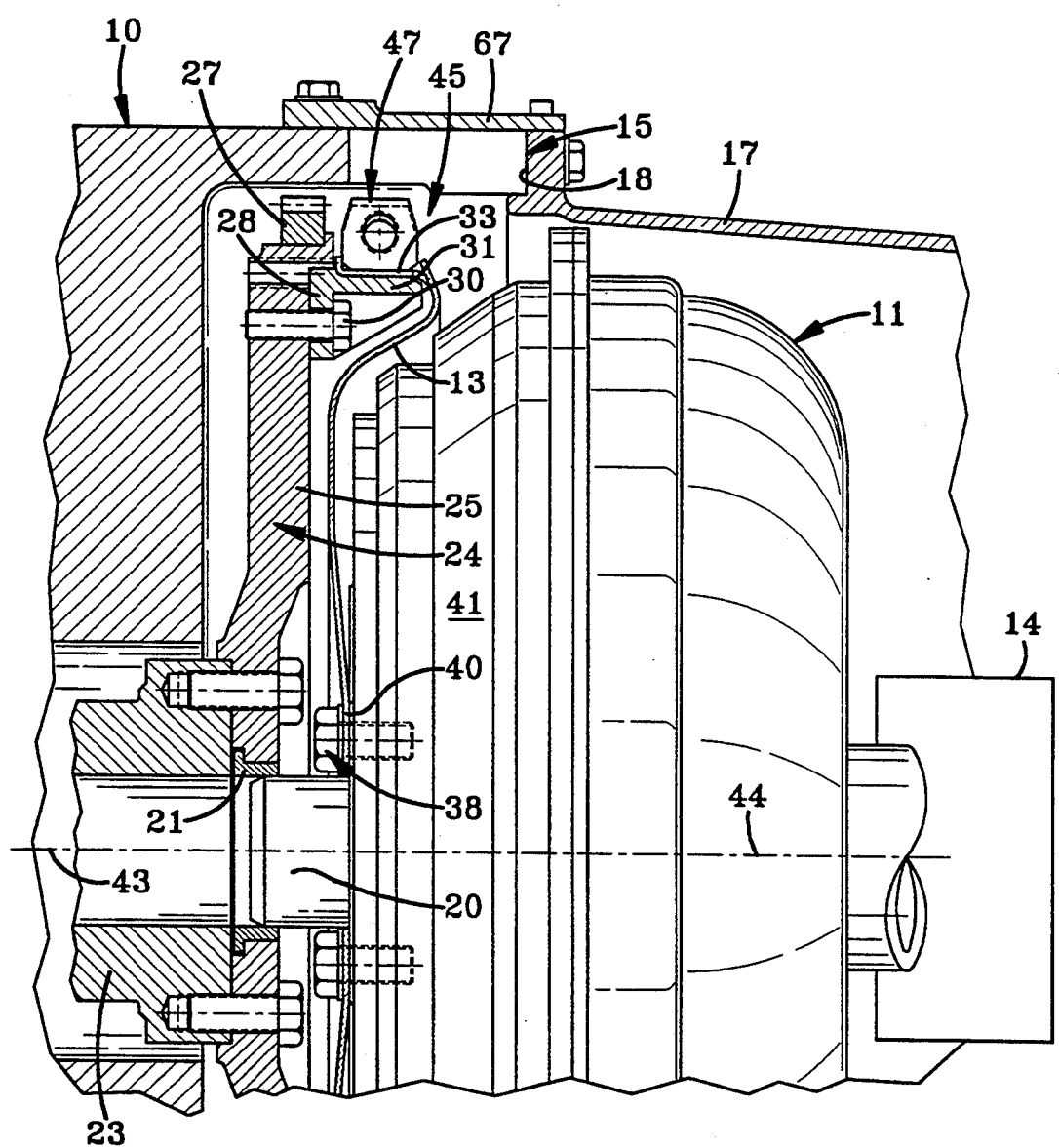
FIG. 1 is a side elevational view, partly in section, of an engine and transmission drive connection interface incorporating the concepts of the present invention.

Referring to the drawings, wherein like characters represent the same or corresponding components, a conventional engine 10 is depicted as being drivingly connected to a conventional torque converter 11 by a flex plate 13. The torque converter 11 is a component in a conventional transmission 14 which is well known is selectively operable to establish a plurality of ratios between the engine 10 and the drive axle of a vehicle, not shown. The engine 10 has a mounting wall 15 to which a transmission, or flywheel, housing 17 is connected at the split-line 18. The torque converter has a mounting, or guide, nose 20 which is disposed in a bushing, or pilot, 21 secured in a flange, or adaptor, 23 on the crankshaft of the engine 10.

Also connected to the flange 23 is a flywheel 24 which incorporates a radially extending, annular wall 25, the outer periphery of which terminates in a starter ring gear 27. An annular, adapter plate 28 is secured to the annular wall 25, as by a plurality of fasteners 30. The adapter plate 28 presents an axially extending, annular wall 31. A rim 33 on the flex plate 13 is disposed in substantially continuous annular contact with the annular wall 31.

The flex plate 13 is substantially annular and presents a mounting annulus 34 near the inner periphery 35 of the flex plate 13. The mounting annulus 34 has a plurality of equiangularly spaced openings 37 which accommodate threaded fasteners 38 for securement of the flex plate 13 to a flange 40 on the input shell 41 of the torque converter 11. The nose 20 and the bushing, or pilot, 21 cooperate to align the centerline 43 of the engine 10 with the centerline 44 of the torque converter 11 perpendicular to the plane of the split-line 18. In a majority of the engine-transmission assemblies, the mounting faces of these components will be perpendicular with the centerlines 43 and 44 such that the engine 10 and transmission 11 will be coaxially disposed. However, in some instances, one or both of the mounting faces at the split-line 18 will be slightly out of perfect alignment as a result of machining tolerances. This modest misalignment will cause a slight angularity between the centerline 43 of the engine crankshaft and the centerline 44 of the torque input shell 41 that could result in a slight wobble of the input shell 41 were this misalignment permitted to continue. Prior art connections would result in significant wear at the bearings supporting the torque converter 11 in the transmission housing 17. However, the flex plate 13 accommodates such slight angular misalignment.

The rim 33 of the flex plate 13 is maintained in frictional contact with the annular wall 31 by a band clamp 45 that encircles the rim 33. The band clamp 45 has a threaded fastener assembly 47 which is tightened after assembly of the transmission 14 to the engine 10. As best seen in FIG. 2, the fastener assembly 47 has head portions 48 and 50 secured to respective ends 51 and 53 of a flexible band portion 54. A threaded fastener 55 is inserted through an opening 57 in the head 48 and threaded into the head 50. By tightening the fastener 55 in the head 50, the ends 51 and 53 of the flexible band portion 54 are drawn toward each other to compress the band portion 54 onto the rim 33. The force thus exerted on the rim 33 creates a frictional engagement between the rim 33 and the annular wall 31. This engagement will provide for the transmission of torque between the engine 10 and the torque converter 11 without slippage therebetween.

The flex plate 13 is preferably formed from flat plate 60 of sheet metal, as shown in phantom line in FIG. 3, by a stamping operation. During the stamping operation, the outer periphery 58 of the flat plate 60 is provided with radial slots 61. These slots 61 accommodate the compression of the rim 33 on the wall 31. Also during the stamping operation, a lip 63 is formed at the outer edge of the rim 33 on the segments 64 defined between adjacent slots 61, and a plurality of fingers, or tabs, 65 are also formed on the rim 33 in opposition to the lip 63. In the configuration of the flex plate 13 depicted in FIG. 3, the distal edge of the fingers 65 are separated from the main body of the flex plate 13. To the contrary, in the configuration of the embodiment depicted in FIG. 4, the tabs 65 are formed by the displacement of metal without separation from the main body of the flex plate 33.

The lip 63 and fingers 65 will limit the axial movement of the band 54 on the rim 33 received therebetween in order to ensure against displacement of the band from the rim during assembly of the rim 33 onto the wall 31. During assembly of the transmission 11 to the engine 10, an access cover 67 is removable from the housing 17 to permit access to the fastener 55. The rim 33 is preferably coated with a solid lubricant and is sufficiently expanded at assembly to allow installation thereof over the wall 31. The lubricant will reduce the resistance to installation and will provide a uniform stress field between individual segments 64 to ensure a uniform clamping load. The nose 20 and bushing, or pilot, 21 will establish the alignment of the components. When the transmission has been fully installed with the rim 33 surrounding the wall 31, the fastener 55 is tightened into the head 50 drawing the rim 33 tight onto the wall 31 to ensure the integrity of the assembly.

Figure 7:
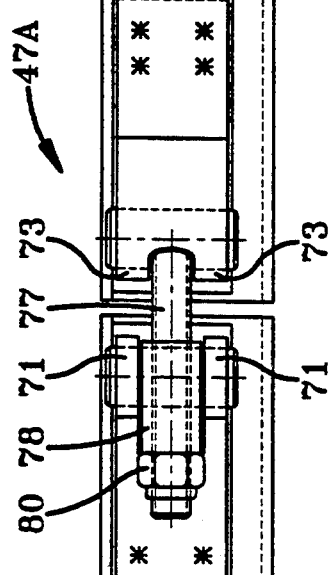
FIG. 7 is a view taken substantially along line 7—7 of FIG. 5.
Figure 5:
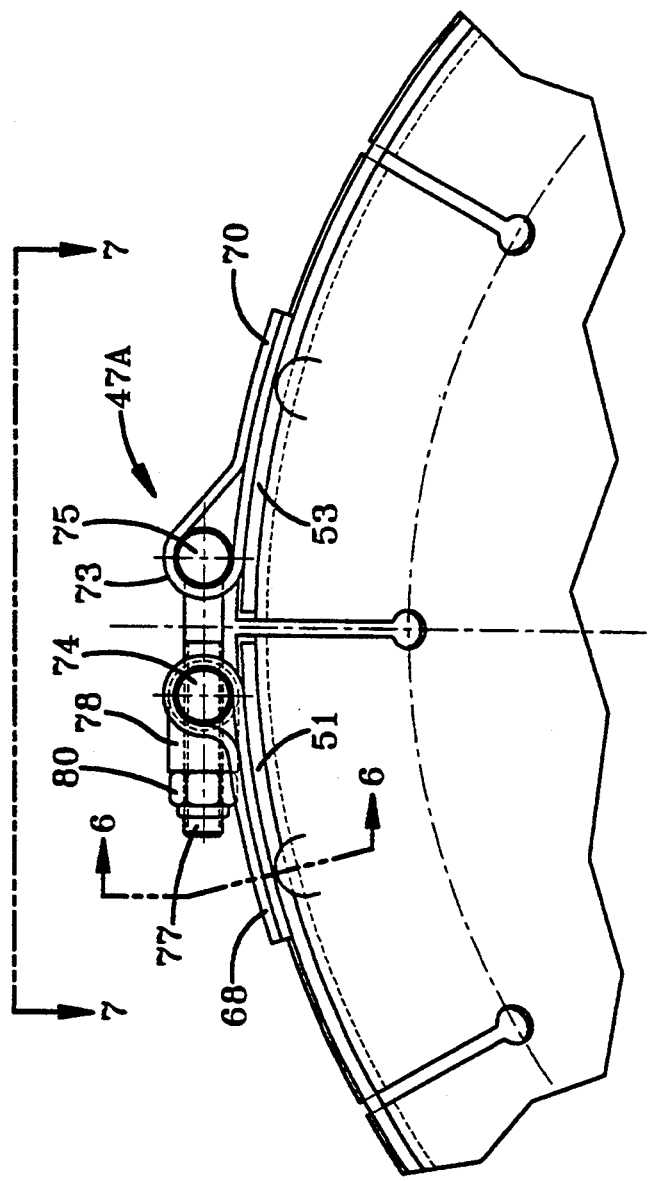
FIG. 5 is a view similar to FIG. 2 depicting an alternative design of the threaded fastener.
Figure 6:
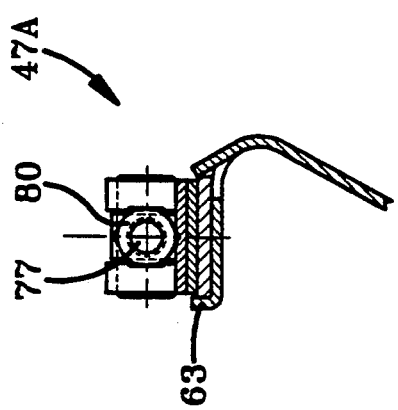
FIG. 6 is a view taken substantially along line 6—6 of FIG. 5.

An alternate construction of the fastener assembly 47A is shown in FIGS. 5 through 7. The fastener assembly 47A has a pair of head members 68 and 70 secured, by welding, to the respective ends 51 and 53 of the flexible band portion 54. Each head member 68 and 70 have respective bifurcated loop portions 71 and 73 in which are disposed respective pins 74 and 75. The pin 75 has a longitudinally extending threaded portion 77 which passes through a sleeve portion 78 formed on the pin 74. The threaded portion 77 is engaged by a locking type nut 80 that will ensure against loosening during operation of the engine 10. The fastener assemblies 47 and 47A do not draw the ends 51 and 53 of the band 54 into abutment such that the assembler will be aware of the tightening torque being applied to the fastener assembly 47 and 47A. Accordingly, an automatic torque wrench is suggested for use in effecting assembly of a drive connection embodying the concepts of the present invention.

The fastener assembly 47 or 47A can create an unbalance in the drive interface. To accommodate this unbalance, an equivalent mass, or balance weight, 81 is secured to the band 54 diametrically opposite the assembly 47 or 47A. Thus, during rotation of the flywheel 24, the assembly will remain in dynamic balance. Other means of balancing are possible.

The flex plate may also be secured at the inner periphery to the engine crankshaft flange 23 and at the outer periphery to the input shell 41. With this installation, the annular wall 31 is presented from the input shell 41. The wall 31 can be welded to the input shell prior to assembly of the torque converter or can be integrally formed on the shell 41 during the manufacturing of the input shell 41.

The foregoing description of the exemplary embodiment of the invention has been presented for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

As should now be apparent, the present invention not only teaches that a drive connection between and engine and a torque converter embodying the concepts of the present invention requires only one threaded member but also that the other objects of the invention can likewise be accomplished.

We claim:

1. A rotating drive connection between an engine output member and a transmission input member, said connection comprising:

a flex plate having an inner hub portion secured for rotation with one of said output member and said input member;

an outer axially extending, annular rim on said flex plate;

an annular drive wall disposed on the other of said output member and said input member disposed radially inwardly of and circumferentially abutting said rim; and, clamp means having an annular band portion disposed circumjacent said rim; and, tightening means for tightening said annular band portion about said rim for frictionally securing said rim with said annular drive wall.

2. A drive connection, as set forth in claim 1, wherein:

said rim has axially spaced lip and finger portions to position said annular band portion axially on said rim.

3. A drive connection, as set forth in claim 1, wherein:

said band portion has spaced open ends; and, said tightening means has a threaded member operatively connected with one of said open ends;

a receptacle operatively connected with the other of said open ends; and, means threadably engaging the threaded member and cooperating with the receptacle for drawing the open ends toward each other.

4. A drive connection, as set forth in claim 2, wherein:

said flex plate includes an outer periphery defined by a plurality of segments presenting radially oriented spaces at the annular rim to permit radial contraction of said rim during tightening of said tightening means.

* * * * *